(12) United States Patent
Liu et al.

(10) Patent No.: US 11,519,317 B1
(45) Date of Patent: Dec. 6, 2022

(54) ENGINE SYSTEMS WITH EXHAUST AIR INJECTION AFTER THREE-WAY CATALYTIC CONVERTERS FOR NON STOICHIOMETRIC RICH OPERATION

(71) Applicant: GM GLOBAL TECHNOLOGY OPERATIONS LLC, Detroit, MI (US)

(72) Inventors: Chengke Liu, Novi, MI (US); Rafat F Hattar, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/649,840

(22) Filed: Feb. 3, 2022

(51) Int. Cl.
*F01N 3/32* (2006.01)
*F01N 3/10* (2006.01)

(52) U.S. Cl.
CPC .............. *F01N 3/32* (2013.01); *F01N 3/101* (2013.01); *F01N 3/103* (2013.01); *F01N 2250/04* (2013.01); *F01N 2270/04* (2013.01); *F01N 2560/022* (2013.01); *F01N 2570/10* (2013.01); *F01N 2570/12* (2013.01); *F01N 2570/14* (2013.01)

(58) Field of Classification Search
CPC .............................. F01N 3/101; F01N 13/0093
See application file for complete search history.

(56) References Cited

U.S. PATENT DOCUMENTS

| | | | | |
|---|---|---|---|---|
| 5,285,640 A * | 2/1994 | Olivo | ................... | F01N 3/2006 422/174 |
| 5,542,249 A * | 8/1996 | Heath | ..................... | F01N 1/18 366/337 |
| 6,401,449 B1 * | 6/2002 | Hofmann | ............. | F01N 3/2892 60/309 |
| 2006/0179824 A1 * | 8/2006 | Roser | ..................... | F02M 26/35 60/303 |
| 2019/0353067 A1 * | 11/2019 | Moser | ........................ | F01N 3/22 |
| 2019/0376432 A1 * | 12/2019 | Paukner | .................... | F01N 3/05 |

(Continued)

FOREIGN PATENT DOCUMENTS

DE 102011083904 A1 * 4/2013 ............ F01N 3/206
DE 102020107130 A1 * 9/2021

(Continued)

OTHER PUBLICATIONS

Machine translation of DE-102020107130-A1, accessed Jun. 29, 2022. (Year: 2022).*

(Continued)

*Primary Examiner* — Jonathan R Matthias
(74) *Attorney, Agent, or Firm* — Lorenz & Kopf, LLP

(57) ABSTRACT

Engine systems use a three-way catalyst followed by air injection and mixing to convert all hydrocarbons and carbon monoxide under various load conditions when exhaust gas temperature is above 500 degrees Celsius. A three-way catalytic converter is disposed in the exhaust system. A nozzle is configured to inject air into the exhaust system downstream from the three-way catalytic converter. A mixing plate with or without catalyst coatings is disposed in the exhaust system downstream from the nozzle. The mixing plate is bow shaped with a concave shaped side facing the nozzle to enhance carbon monoxide conversion. Optional two way catalytic converters are added downstream from the mixing plate to further reduce tailpipe hydrocarbon and carbon monoxide emissions.

20 Claims, 7 Drawing Sheets

(56) References Cited

U.S. PATENT DOCUMENTS

2020/0040784 A1\* 2/2020 Baron Von Ceumern-
          Lindenstjerna ......... F01N 3/101
2022/0065149 A1\* 3/2022 Chen ....................... F01N 3/101

FOREIGN PATENT DOCUMENTS

WO    WO-2005085611 A1 \* 9/2005  ............... F01N 3/22
WO    WO-2016039720 A1 \* 3/2016  ............... F01N 3/10

OTHER PUBLICATIONS

Machine translation of DE-102011083904-A1, accessed Jun. 29, 2022. (Year: 2022).\*
Machine translation of WO-2005085611-A1, accessed Jun. 29, 2022. (Year: 2022).\*

\* cited by examiner

ENGINE SYSTEMS WITH EXHAUST AIR INJECTION AFTER THREE-WAY CATALYTIC CONVERTERS FOR NON STOICHIOMETRIC RICH OPERATION

INTRODUCTION

The present invention relates to engine systems and exhaust systems thereof, and more particularly relates to engine systems with exhaust systems that employ air injection followed by enhanced mixing, all downstream from a three-way catalytic converter system to convert residual carbon monoxide, including heavy vehicle load conditions with enrichment operations.

Internal combustion engines convert fuel and air to various compounds while extracting energy to perform intended functions, such as propelling a vehicle. The compounds expelled from engines may be further converted or treated by various aftertreatment systems. A three-way catalytic converter is designed for converting hydrocarbons, carbon monoxide and nitrogen oxides to innocuous elements or compounds. A three-way catalytic converter operates most effectively when the engine runs at a stochiometric air fuel mixture to achieve optimal conversation efficiency. Some engines, such as gasoline engines, may be operated at non-stoichiometric conditions for various purposes. For example, when operated under heavy load conditions, the engine may be operated at richer conditions than stoichiometric, such as for diagnosis or component protection purposes. Under heavy load conditions where excess heat is produced. It may be undesirable to exhaust non-stoichiometric combustion products from an engine to the atmosphere for a variety of reasons.

In addition, certain regulations may have requirements that evaluate vehicle engine operation under heavy load conditions such as under maximum vehicle payload and towing capacity conditions. Operating under these conditions, while also providing the preferred diagnosis and component protection purposes is challenging, yet desired.

Accordingly, it is desirable to provide vehicle exhaust aftertreatment systems that enable providing the desired diagnosis and component protection purposes while limiting undesirable emissions, or emissions in excess of regulation requirements. Furthermore, other desirable features and characteristics of the present invention will become apparent from the subsequent detailed description and the appended claims, taken in conjunction with the accompanying drawings and the foregoing technical field and background.

SUMMARY

Engine systems use a three-way catalyst followed by air injection and mixing to convert all hydrocarbons and carbon monoxide to innocuous constituents under different various load conditions. In various embodiments, an engine system includes an engine configured to consume fuel and air to generate an exhaust gas stream. An exhaust system channels the exhaust gas stream from the engine to a tailpipe for emission. A three-way catalytic converter is disposed in the exhaust system. A nozzle is configured to inject air into the exhaust system downstream from the three-way catalytic converter. A mixing plate is disposed in the exhaust system downstream from the nozzle. The mixing plate is bow shaped with a concave shaped side facing the nozzle to enhance carbon monoxide conversion.

In additional embodiments, an oxidation chamber is disposed downstream from the catalytic converter, and the mixing plate is disposed in the oxidation chamber.

In additional embodiments, a number of holes are formed through, and distributed across, the mixing plate. The mixing plate has an outer perimeter and a series of cutouts around the outer perimeter.

In additional embodiments, a substrate chamber is disposed downstream from the mixing plate. The substrate chamber contains a substrate configured to channel and mix the exhaust gas stream.

In additional embodiments, at least one of the mixing plate and the substrate are coated with a catalyst to enhance carbon monoxide reduction in the exhaust gas stream.

In additional embodiments, a controller is configured to control a rate of the injected air through the nozzle based on a load of the engine.

In additional embodiments, the catalytic converter comprises a pair of three-way catalytic converters configured to convert hydrocarbons, carbon monoxide and nitrous oxides.

In additional embodiments, an injection system includes the nozzle and a pump configured to pressurize air from the engine and to supply the air to the nozzle.

In additional embodiments, the pump comprises a turbocharger of the engine.

In additional embodiments, a wastegate of the turbocharger comprises a three-way valve configured to divert boost air to the nozzle.

In a number of other embodiments, an engine system includes an engine configured to consume fuel and air to generate an exhaust gas stream. An exhaust system channels the exhaust gas stream from the engine to a tailpipe for emission. Two three-way catalytic converters are disposed in the exhaust system. An air injection system with a nozzle is configured to inject air into the exhaust system downstream from the three-way catalytic converters. A mixing plate is disposed in the exhaust system downstream from the nozzle. The mixing plate is bow shaped with a concave shaped side facing the nozzle.

In additional embodiments, an oxidation chamber is disposed downstream from the three-way catalytic converters. The mixing plate is disposed in the oxidation chamber. The oxidation chamber has an insulated wall to retain heat.

In additional embodiments, a number of holes formed through, and distributed across, the mixing plate. The mixing plate has an outer perimeter and a series of cutouts around the outer perimeter. The nozzle is formed by a pipe segment extending into the exhaust system, where the pipe segment has a nozzle orifice comprising an opening in the pipe segment that opens in a downstream direction toward the mixing plate.

In additional embodiments, a substrate chamber is disposed downstream from the mixing plate. The substrate chamber contains a substrate configured to channel and mix the exhaust gas stream. The substrate is coated with a two-way catalyst configured to convert hydrocarbons and carbon monoxide.

In additional embodiments, a pump supplies air to a buffer tank that receives and stores the air from the pump. The buffer tank enables controlling air injection flow, while reducing flow rate requirements of the pump.

In additional embodiments, a sensor is configured to measure a parameter of the exhaust gases. The sensor is disposed in the exhaust system downstream from the nozzle. A controller is configured, based on the parameter, to control a rate of the injected air through the nozzle to correspond the rate with the parameter measured by the sensor to consume all remaining carbon monoxide in the exhaust gas stream.

In additional embodiments, the engine includes a crankcase connected with the air injection system. Crankcase energy from the crankcase is configured to introduce air to the nozzle.

In additional embodiments, an injection system includes a pump configured to pressurize air from the engine and supply the air to a nozzle. A heater is disposed in the injection system and is configured to heat the pressurized air.

In additional embodiments, the pump comprises a turbocharger of the engine. A wastegate of the turbocharger comprises a three-way valve configured to divert boost air to the nozzle.

In a number of additional embodiments, an engine is configured to consume a gasoline fuel and air to generate an exhaust gas stream. An exhaust system channels the exhaust gas stream from the engine to a tailpipe for emission. Two three-way catalytic converters are included in the exhaust system. An oxidation chamber is disposed in the exhaust system downstream from the second three-way catalytic converter. An air injection system with a nozzle injects air into the exhaust system for mixing with the exhaust gas stream in the oxidation chamber. A mixing plate is disposed in the oxidation chamber downstream from the nozzle. The mixing plate is bow shaped with a concave shaped side facing the nozzle. The engine is configured to operate at rich of stoichiometric conditions producing excess carbon monoxide that saturates the three-way catalytic converters. The oxidation chamber is configured to convert the excess carbon monoxide to carbon dioxide.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

As disclosed herein, the injection of air after a three-way catalyst exhaust treatment regimen, reduces exhaust gases such as hydrocarbons, carbon monoxide, and particulate matter (soot) emissions. At exhaust temperatures greater than 500 degrees Celsius, hydrocarbons, carbon monoxide, and particulate matters are converted rapidly via the introduction of air into the exhaust stream. The conversion is assisted by a mixing device, which creates turbulence to increase the air and exhaust gas mixing and reactions. In embodiments, a mixing plate and an insulated walled exhaust pipe after the air injection further enhances the oxidation of gases (hydrocarbons and carbon monoxide). The mixing plate may be coated with a catalyst to enhance conversion, particularly of carbon monoxide. The air injection source may be provided by an auxiliary pump, or may be tapped from the engine's compressor, with a valve and/or choke nozzle. For vehicles with a turbocharger, the boost pressure and turbocharged air may be used as the source. In other embodiments, the air source may be from the crankcase using the energy generated therein to provide the air injection. In embodiments, the air source may be a supercharger compressor or another air pumping device included with the engine. The aftertreatment system configuration generally consists of a three-way catalytic converter plus an air injection system plus a bow shape mixing plate. An optional two-way catalytic converter may be added to further reduce tailpipe emissions of hydrocarbons and carbon monoxide. In embodiments, the hydrocarbons are converted to innocuous carbon dioxide and water, and the carbon monoxide is converted to innocuous carbon dioxide.

Figure 1:
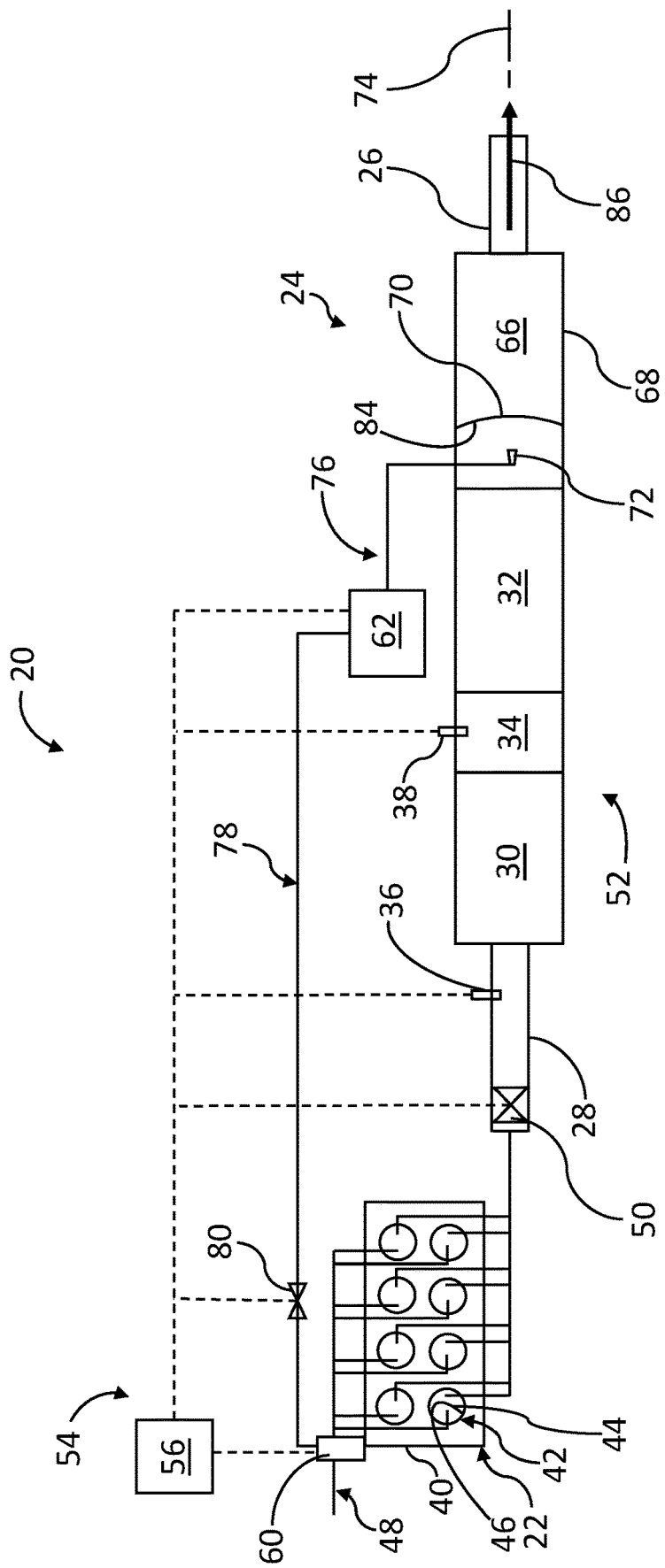
FIG. 1 is a schematic illustration of an engine system with post three-way catalyst air injection and mixing features, in accordance with various embodiments.

Referring to FIG. 1, an engine system 20 includes an internal combustion engine 22, which in the present embodiment in a gasoline and air consuming engine. The engine 22 may be naturally aspirated or may include a turbocharger or supercharger to pump air into the engine for combustion. The engine system 20 includes an exhaust system 24 for conveying exhaust gases from the combustion chambers of the engine 22 to a tailpipe 26 for discharge to the atmosphere. A pipe 28 runs from the engine 22, such as from its exhaust manifold(s) to an aftertreatment device in the form of a three-way catalytic converter 30. A second three-way catalytic converter 32 is disposed downstream for the three-way catalytic converter 30, with an open chamber 34 disposed between the two three-way catalytic converters 30, 32. The three-way catalytic converters 30, 32 are configured to convert three components in the gas stream to other elements or compounds including converting hydrocarbons, carbon monoxide and nitrogen oxides to innocuous elements or compounds. The three-way catalytic converters 30, 32 may contain catalysts such as platinum, palladium, rhodium, or other materials.

An oxygen sensor 36 is disposed upstream from the three-way catalytic converter 30 in the pipe 28 to measure oxygen content in the gas stream leaving the engine 22. Another oxygen sensor 38 is disposed downstream from the three-way catalytic converter 30 in the chamber 34. The oxygen sensor 36 measures engine out emissions, and in particular may be used to measure carbon monoxide content in the gas stream leaving the engine 22. The oxygen sensor 38 measures oxygen content in the gas stream after the three-way catalytic converter 30 and may be used to determine the amount of remaining carbon monoxide at the chamber 34.

The engine 22 generally has an engine block 40 defining a number of cylinders such as cylinder 42, each having a piston such as piston 44 coupled to a crankshaft (not shown) to reciprocate in its cylinder 42. In the current embodiment, eight cylinders are included. In other embodiments, a different number of cylinders may be included. In each cylinder such as cylinder 42, a combustion chamber is defined, such as combustion chamber 46. A fuel and air mixture (not shown) is delivered into the combustion chambers 46 et al. and ignited, resulting in hot expanding exhaust gases causing reciprocal movement of the pistons 44 et al. Combustion intake air is supplied through an intake system 48. The intake air may be distributed to the cylinders 42 et al. The exhaust system 24 directs exhaust gases leaving the cylinders 42 et al. after combustion. The exhaust system 24 may include an aftertreatment system 52 including the three-way catalytic converters 30, 32.

The engine system 20 also includes a control system 54 that generally includes a controller 56, various actuators and sensors. The controller 56 may receive various signals from the sensors and send control signals to various actuators for operation of the engine system 20. The sensors are sensing devices that sense observable conditions of the engine system 20 and in the current embodiment include the oxygen sensors 36, 38, along with other typical engine system sensors. In the current embodiment, the actuators may include an exhaust valve 50, a pump 60 and a heater 62, along with other typical engine system actuators. The controller 56 commands an amount of fuel to be delivered to each cylinder 42 et al. The amount of fuel commanded, generally correlates to the amount needed for stoichiometric operating conditions given the current operating state of the engine 22. Stoichiometric operation results in complete burning of the fuel and air delivered to the cylinders 42 et al.

Under certain operating conditions, the controller 56 may depart from stoichiometric operating conditions according to preprogrammed algorithms. For example, under heavy load conditions, excess fuel may be delivered to the cylinders 42 et al. for various reasons. Other operating conditions may require excess fuel for diagnostic purposes. When excess fuel is delivered, the aftertreatment system 52 may become saturated, meaning that complete conversion of the target constituents in the exhaust gas stream does not occur. For example, all hydrocarbons and carbon monoxide may not be converted as desired. In addition, particulate matter may remain in the exhaust gas stream under the heavy load conditions. Accordingly, additional measures are described herein to address the hydrocarbons, carbon monoxide and particulate matter remaining in the exhaust gas stream under non-stoichiometric and/or other conditions.

The current embodiment of FIG. 1 includes an oxidation chamber 66 that receives the exhaust gases leaving the three-way catalytic converter 32 and which is disposed downstream thereof. The oxidation chamber 66 has an insulated wall 68 configured to retain heat inside the oxidation chamber 66. For example, the wall 68 may be a double layer of metal with air in-between, or an insulating material such as a ceramic material may be disposed on one layer of metal or between two layers of metal. A mixing plate 70 is disposed in the oxidation chamber 66 and spans across the flow path through the oxidation chamber 66 to maximize air and exhaust gas flow interaction and mixing. An injection nozzle 72 is disposed in the oxidation chamber 66 upstream from the mixing plate 70. The injection nozzle 72 is located at the centerline 74 of the oxidation chamber 66 in this example. The injection nozzle 72 is part of an injection system 76 that includes a conduit circuit 78, the pump 60, the heater 62 and a control valve 80. The control valve 80 is configured to control the flow of air through the conduit circuit 78 and may be a part of the actuators of the engine system 20.

In the current embodiment, the injection system 76 delivers fresh air from the intake system 48 of the engine 22, from a location upstream of the cylinders 42 et al. to the injection nozzle 72 inside the oxidation chamber 66. It should be noted that air may also be sourced from the crankcase 82, from a compressor of the engine 22, or from another pumping device of the engine 22. In the case of the crankcase 82 as the source, the crankcase energy may be used to flow air through the nozzle 72, or the pump 60 may be added to increase injection pressure. The pump 60 may be any type of pump, including a diaphragm pump and the heater 62 may be any type of heater capable of raising air temperature to 500 degrees Celsius or more, such as an electric element heater or an exhaust gas heat exchanger. The injection system 76 is configured to inject hot (500 degrees Celsius or above) air into the oxidation chamber 66. When the injected air mixes with the exhaust gas stream, as assisted by the mixing plate 70, the remaining hydrocarbons, carbon monoxide and particulate matter are consumed/converted to innocuous elements or compounds. The amount of injected air is supplied in an amount sufficient to consume the remaining constituents as determined by the controller 56, with input from the various sensors including the sensors 36, 38.

The mixing plate 70 is disposed in the oxidation chamber 66 downstream from the nozzle 72 so that the injected air impinges on the mixing plate 70 and disturbs the otherwise laminar flow of exhaust gases. At heavy loads of the engine 22, the flow rate of the exhaust gases is high and the flow is of the laminar nature as a result. The mixing plate 70 has a bow shape, which may be described as curved, with a concave side 84 facing the nozzle 72. The mixing plate 70 has a number of holes and/or gaps, such as across its body and around its outer perimeter to allow ongoing exhaust gas flow and is described in greater detail below. The mixing plate 70 may be plain steel or may have a two-way catalyst coating 92 applied to its surface, such as platinum, palladium, etc. to assist with conversion/oxidation of residual carbon monoxide and hydrocarbons. The exhaust gas with mixed air in the oxidation chamber 66 consumes the residual/remaining carbon monoxide, hydrocarbons, and/or particulate matter, and the exhaust gases are delivered to the tailpipe 26 and emitted 86.

The amount of air injected by the injection system 76 may be correlated to the load on the engine 22. For example, when the load on the engine 22 increases, the amount of air injected is increased. The pump 60 overcomes the pressure of the exhaust gas in the oxidation chamber 66 to ensure flow through the nozzle 72. In some embodiments, the heater 62 may be omitted when exhaust gas temperatures are sufficiently high (above 500 degrees Celsius). In any case, the exhaust valve 50 may be modulated to ensure sufficient temperatures in the oxidation chamber 66.

Figure 2:
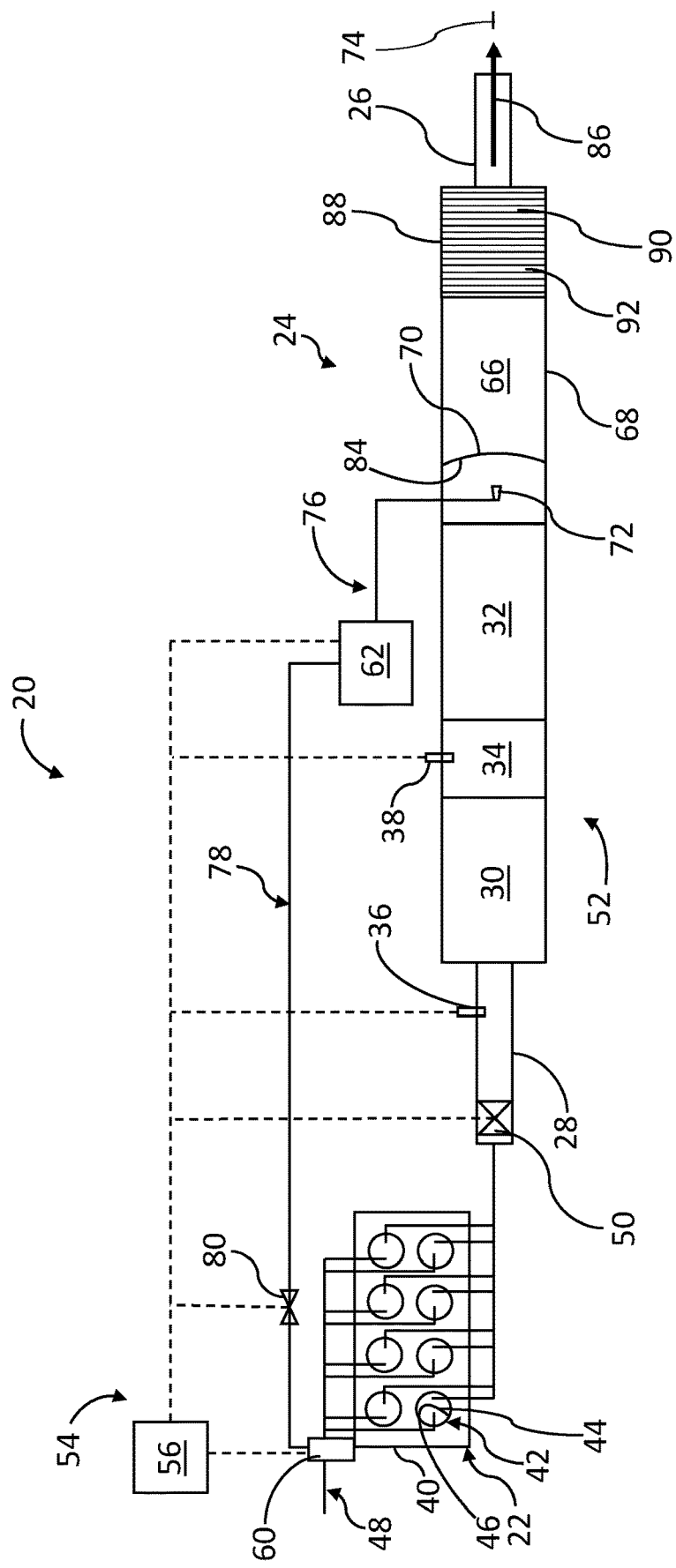
FIG. 2 is a schematic illustration of an engine system with post three-way catalyst air injection, mixing features and a substrate system, in accordance with various embodiments.

Referring to FIG. 2, the engine system 20 is illustrated, modified from that of FIG. 1, with an additional substrate chamber 88 disposed between the oxidation chamber 66 and the tailpipe 26. The substrate chamber 88 contains a substrate 90, such as a high porosity, honeycombed or other multiple passage substrate 90. Adding the high porosity converter substrate 90, such as a ceramic material without coating, further enhances hydrocarbon, carbon monoxide and particulate matter combustion rates by increasing the mixing and reaction temperature to further reduce emissions from the engine system 20, and helps maintain the exhaust heat in the substrate 90. A copper(i) oxide or a rare earth metal oxide coating 92 may be added to the substrate 90 to avoid catalyst poisoning, and small amounts of a precious metal, such as platinum and palladium, may be added in the oxidation chamber 66 and/or on the substrate chamber 88 while reducing their amounts in three-way catalytic converters 30, 32. This addition further improves hydrocarbon, carbon monoxide and particulate matter consumption at the low load conditions, such as after a cold start of the engine 22. Heating air supply, such as by the heater 62 and/or by using exhaust energy from the engine 22, increases the air injection energy to enhance the air and exhaust mixing and to improve conversion in cold conditions. Catalysts added to the mixing plate 70 and/or to the substrate 88, such as via a wash-coat application, improves oxidation and reduces emissions.

Figure 3:
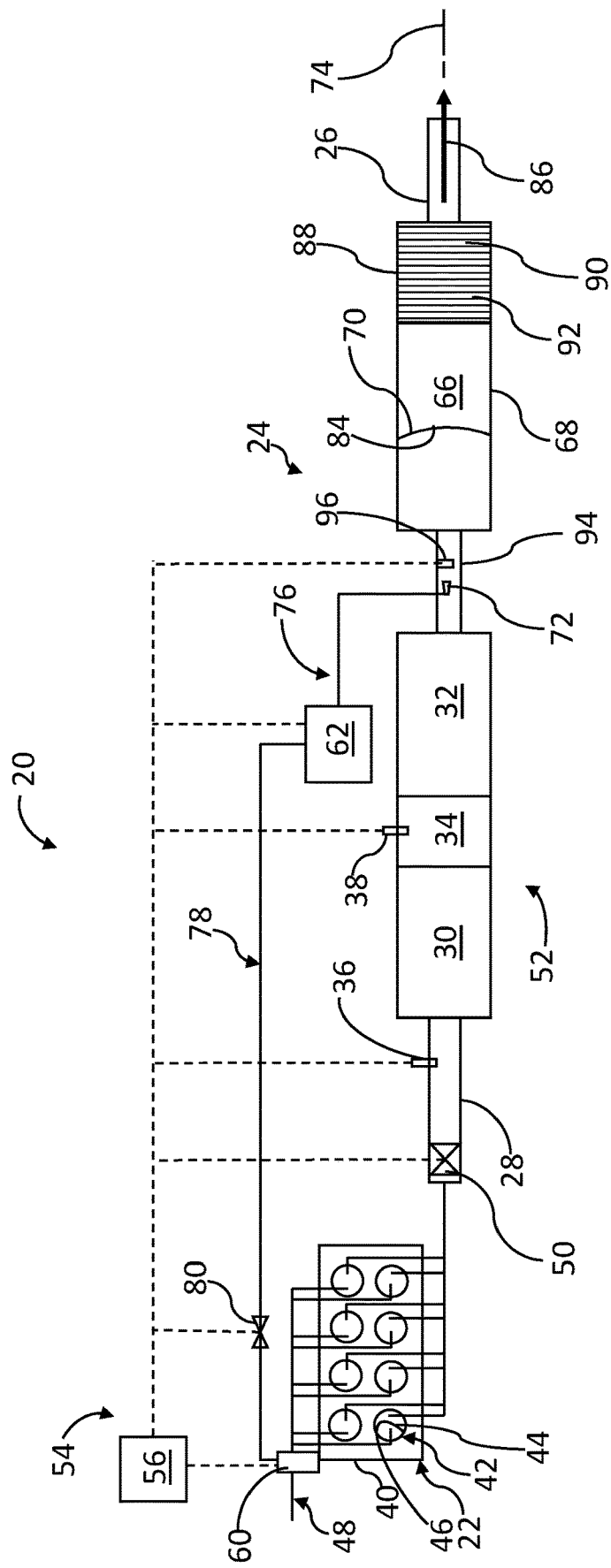
FIG. 3 is a schematic illustration of an engine system with post three-way catalyst air injection, mixing features, and a post three-way catalyst sensor, in accordance with various embodiments.

Referring to FIG. 3, the engine system 20 is illustrated, modified over that of FIGS. 1 and 2, with an additional pipe 94 added between the three-way catalytic converter 32 and the oxidation chamber 66. The nozzle 72 is moved into the pipe 94 to inject air into the pipe 94, while the mixing plate 70 remains in the oxidation chamber 66. An additional sensor 96 is added in the pipe 94 downstream from the nozzle 72. Injecting air into the pipe 94, which then enters the downstream located oxidation chamber 66, provides an opportunity to better sense oxygen/temperature levels of the exhaust gas stream before it enters the oxidation chamber 66. In addition, injection into the pipe 94 may lead to enhanced mixing as the flow stream traverses the narrower pipe 94 and then enters the larger oxidation chamber 66. The sensor 96 may be an oxygen sensor or a temperature sensor. The sensor 96, whether configured to monitor oxygen or temperature, is used by the controller 56 in determining the air injection rate through the nozzle 72, and in either case correlates the air injection rate to the load on the engine 22. The three-way catalytic converters 30, 32 and two-way catalytic converters (oxidation chamber 66 and substrate chamber 88) have separate packages separated by the pipe 94. As such, they may be separately constructed and/or sourced from different suppliers when desirable, and assembled by connection by the pipe 94.

Adding the sensor 96 heightens control of the air injection quantity and timing and may be used to supply a signal/basis for air injection system functional diagnosis. The controller 56 may operate with feedforward and/or feedback control schemes. The feedforward approach receives inputs from the various sensors and computes an air injection rate based on flow (engine load) and oxygen content in the exhaust as a prediction of the amount of injected air flow rate needed, and initiates preemptive control to counteract the anticipated need. Based on the computed injected air flow rate amount, the controller issues a command to the pump 60 to supply the air flow rate sufficient to convert the expected carbon monoxide and other constituents. With feedback control, the supplemental input from the sensor 96, enables setting air flow rate through the nozzle 72 to a rate that ensures a correspondence with the actual oxygen content/temperature as measured by the sensor 96. For example, when the reading of the sensor 96 indicates a correction is needed by deviating from the currently supplied air injection flow rate, a corrected air flow rate is discerned from the anticipated need of feedforward control to set a rate actually based on the measured readings of sensor 96.

Figure 4:
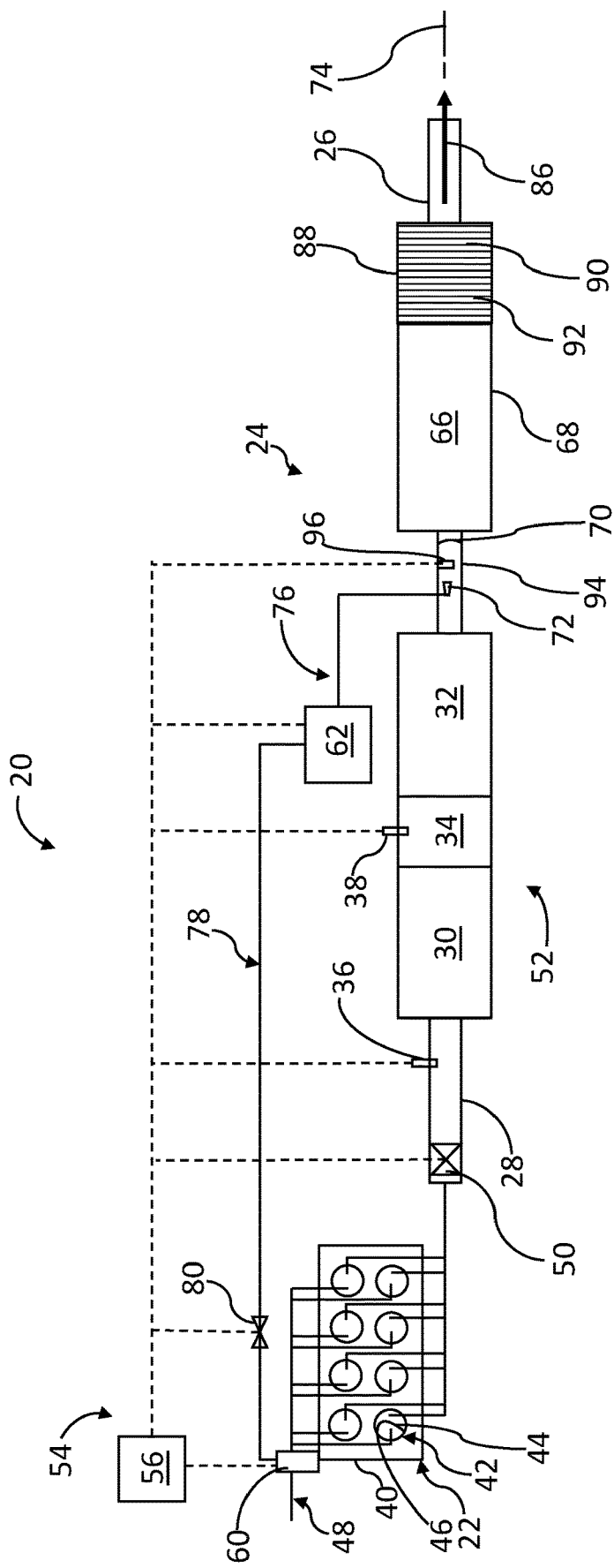
FIG. 4 is a schematic illustration of an engine system with post three-way catalyst air injection and pipe based mixing features, in accordance with various embodiments.

Referring to FIG. 4, the engine system 20 is illustrated, modified over that of FIG. 3, by eliminating the oxidation chamber 66 and by moving the mixing plate 70 into the pipe 94. The mixing plate 70 is physically similar to that of FIGS. 1-3, but smaller to fit within the pipe 94. The arrangement results in an economical construction that saves space and fits is a tighter packaging environment due to the elimination of the oxidation chamber 66. The conversion that would otherwise take place in the oxidation chamber 66 occurs initially in the pipe 94 and finally in the substrate chamber 88. The inclusion of the pipe 94 again means that the three-way catalytic converters 30, 32 and the substrate chamber 88 are separately packaged, optimizing supply and manufacturing options.

Figure 5:
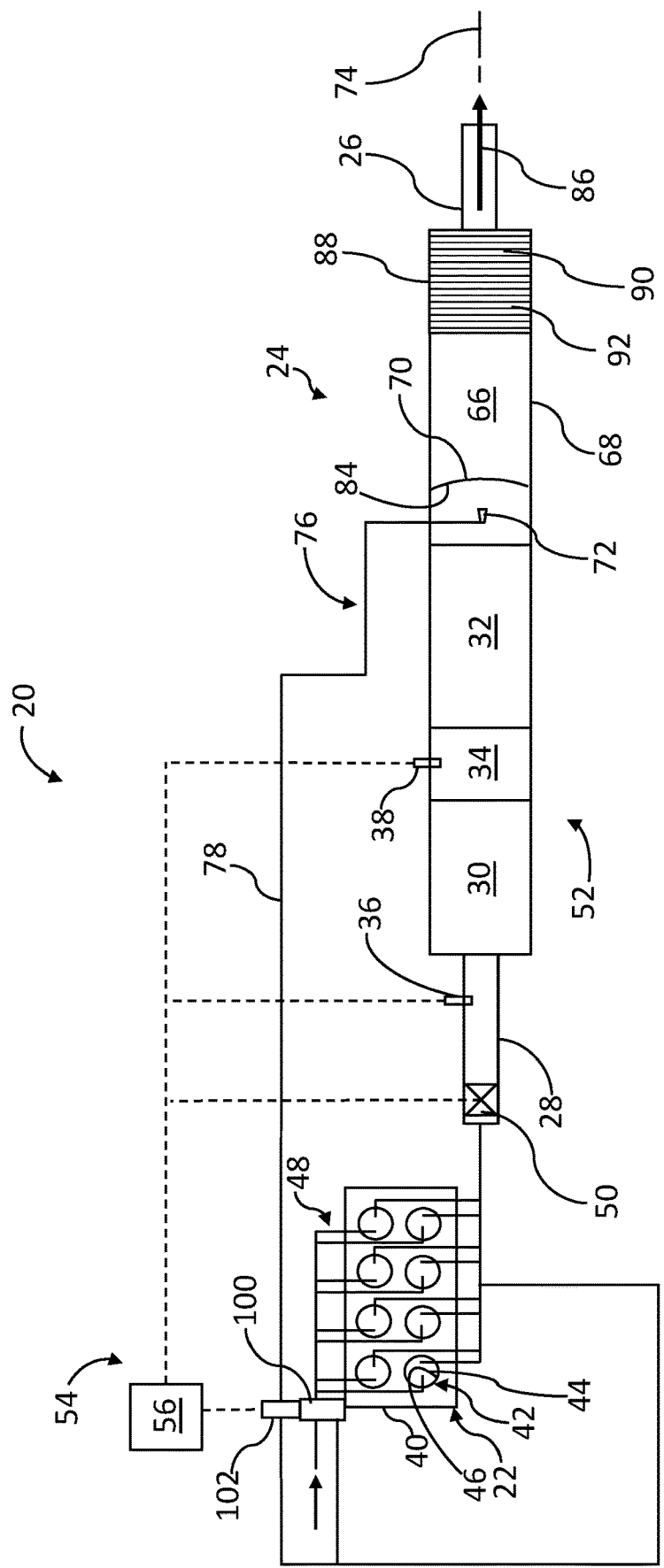
FIG. 5 is a schematic illustration of an engine system with post three-way catalyst air injection from a turbo wastegate source and mixing features, in accordance with various embodiments.

As shown in FIG. 5, a version of the engine system 20 is illustrated for applications where the engine 22 includes a turbocharger 100. The turbocharger 100 may be used as a source for compressed air to feed through the injection system 76 to the nozzle 72. In the current embodiment, the turbocharger 100 includes a wastegate 102 configured as a three-way valve to feed incoming excess boost air directly into the intake manifold, or through the injection system 76 to the nozzle 72. The wastegate 102 may divert some or all of the available boost air to the injection system 76. At heavy loads, the exhaust gas temperatures are generally high enough to obviate the need for an additional heater to reach the over 500 degree Celsius level. The current embodiment enables diverting exhaust gases driving the turbocharger 100, through the wastegate 102 and the injection system 76 and into the oxidation chamber 66. This reduces boost pressure and does not require an additional pump since the turbocharger 100 provides the flow. The wastegate 102 utilizes the exhaust energy to increase intake air pressure, reduces the catalyst temperature in the three-way catalytic converters 30, 32, and improves towing capability at the low speeds. The exhaust valve 50 may be modulated closed to increase the exhaust gas temperature at idle and low loads to improve engine low speed and load emission performance. The valve 80, or choke nozzles at the nozzle 72 may be used to control the air injection rate based on boost pressures at a low cost. The air injection flow rate is correlated to exhaust temperatures and hydrocarbon, carbon monoxide and particulate matter levels after the three-way catalytic converters 30, 32.

Figure 6:
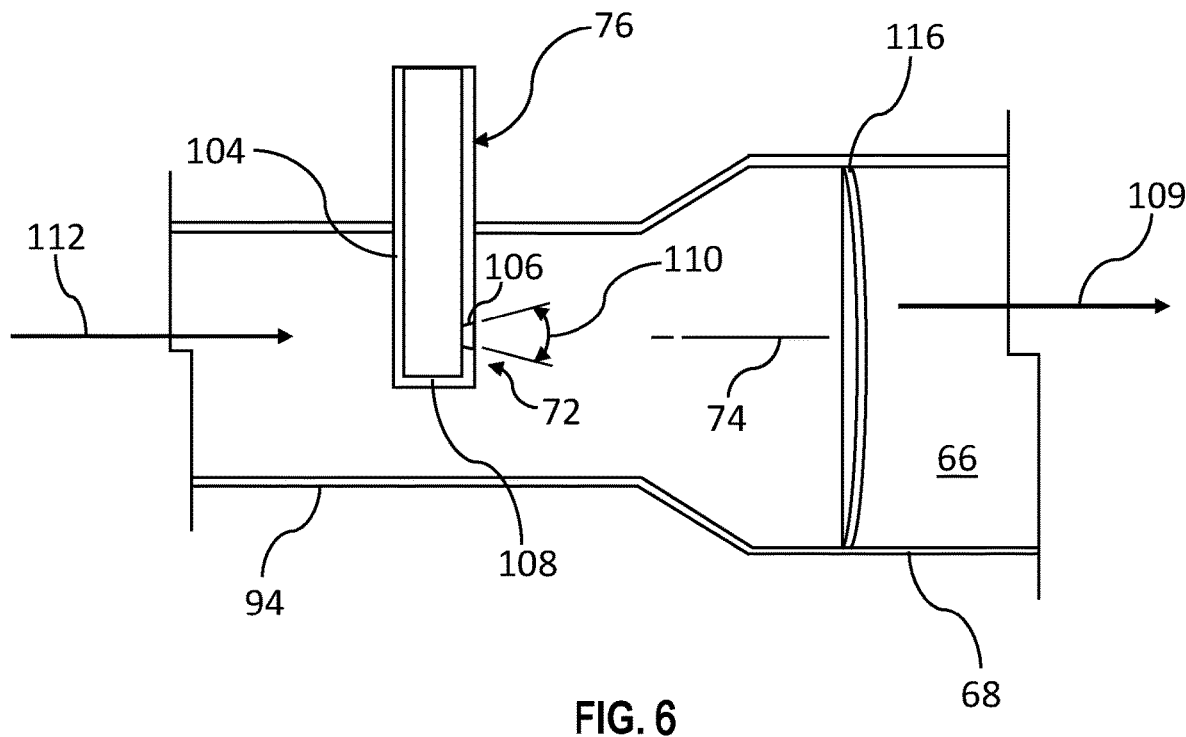
FIG. 6 is a cross-sectional illustration of mixing plate arrangement for the systems of FIGS. 1-5, in accordance with various embodiments.

FIG. 6 illustrates an implementation of the mixing plate 70. In this embodiment, the injection nozzle 72 is disposed in the pipe 94 and the mixing plate 70 is disposed in the oxidation chamber 66. The nozzle 72 includes a pipe segment 104 of the injection system 76 that extends laterally into the pipe 94, in this example, or into the oxidation chamber 66 in other embodiments. The nozzle orifice 106 is an opening in the pipe segment 104 injecting air in a downstream direction 108. The end 109 of the pipe segment 104 is closed so that all flow out of the nozzle 72 is through the nozzle orifice 106. In the current embodiment the nozzle orifice 106 is cut at an angle 110 through the pipe segment 104, which is thirty degrees. The angle 110 helps spread the injected air into the exhaust gas flow stream 112. The nozzle orifice 106 is centered on the centerline 74 of the pipe 94 and of oxidation chamber 66.

Figure 7:
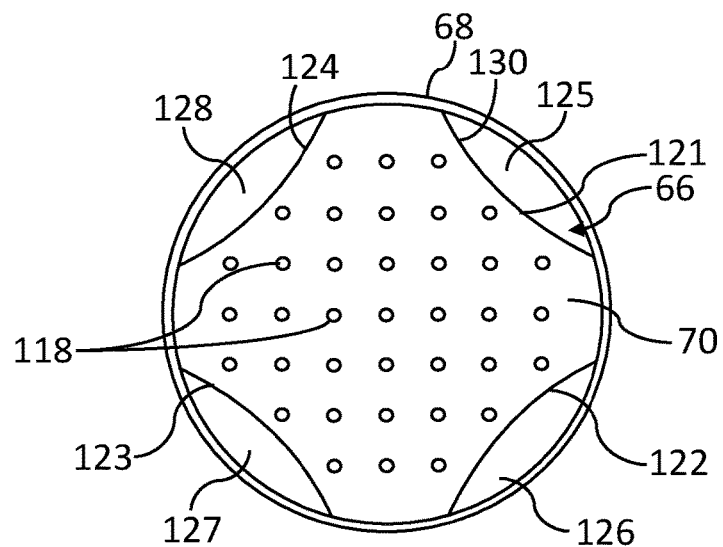
FIG. 7 is a cross-sectional view taken generally through the line 7-7 in FIG. 6 showing the mixing plate, in accordance with various embodiments.

The mixing plate 70 is formed as a bowed metal plate bending in the downstream direction 108 at the centerline 74 as opposed to its outer perimeter 116 at the wall 68 of the oxidation chamber 66. Referring additionally to FIG. 7, the mixing plate 70 includes a number of spaced holes 118 distributed across the entirety of the mixing plate 70. The holes 118 may be aligned in rows and columns as shown, or may be distributed in another pattern to allow flow through the mixing plate 70. The holes 118 may operate to enhance combustion, which may be further increased by the addition of a catalyst coating on the mixing plate 70, such as described above. The holes 118 are formed through the mixing plate 70 parallel to the centerline 74. In addition, the mixing plate 70 has four cutouts 121-124 around its outer perimeter. The cutouts 121-124 provide four openings 125-128 that are significantly larger than the holes 118, ensuring sufficient flow for the exhaust gases. The cutouts 121-124 are evenly spaced and centered at 45°, 135° 225°, and 315° around the 360° perimeter 116 of the mixing plate 70. The cutouts 121-124 are formed by an arched edge, such as edge 130, between the parts of the outer perimeter 116 that contact the wall 68. The mixing plate 70 enhances mixing by generating reversing turbulent flow. The air injector spray angle 110 simulates the curved shape of the mixing plate 70 to enhance the air and exhaust gas mixing. The detailed dimensions of the mixing plate 70 are calculated for each application, such as by using commercial fluid dynamics simulation software, to ensure sufficient flow, acceptable back pressure, and optimal mixing.

Figure 8:
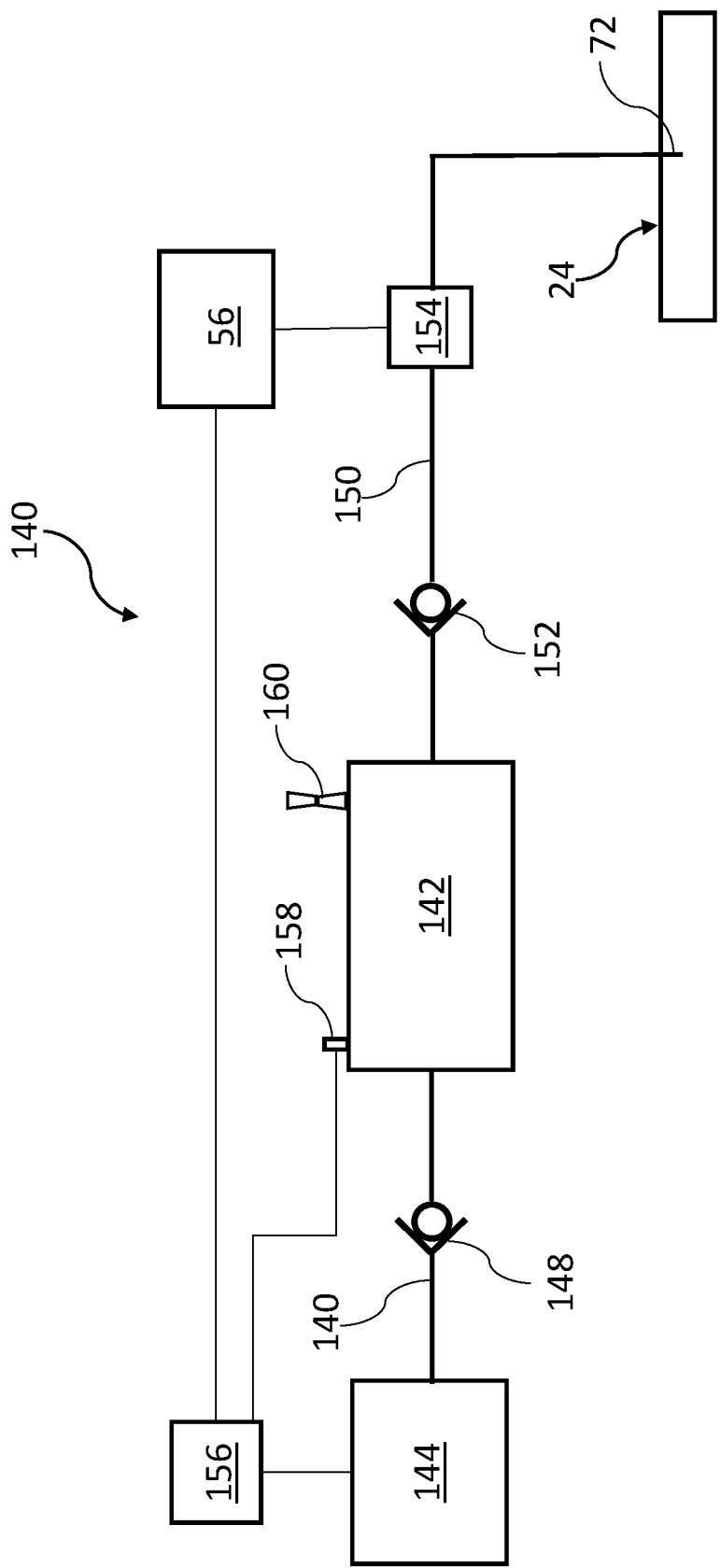
FIG. 8 is an air flow control diagram with a buffer tank and an optional small range air pump, in accordance with various embodiments.

FIG. 8 shows an example air flow control system 140 with a buffer tank 142 and a small flow range air pump 144. Air is delivered to the buffer tank 142 from the air pump 144 through a line 146 and a check valve 148. The check valve 148 allows one-way flow through the line 146 into the buffer tank 142 for storage and select delivery to the nozzle 72. Air is delivered to the nozzle 72 in the exhaust system 24 through a line 150 and a one-way check valve 152 that restricts flow to one direction, which is toward the nozzle 72. The line 150 also includes a mass flow control valve 154 with an actuator as a unit that controls injection air flow to the nozzle 72.

The air pump 144 is operated by a pump controller 156. The pump controller 156 is coupled with a pressure sensor 158 at the buffer tank 142. The pump controller 156 may also be coupled with the controller 56 for cross-communication. In other embodiments, a different number of controllers 156, 56 may be used, such as one controller. The buffer tank 142 also includes a pressure relief valve 160 to limit pressure to the maximum rating for the buffer tank 142.

The air pump 144 is turned on by the pump controller 156 to supply air to the air buffer tank 142 to maintain a constant air pressure therein (e.g., 5 bar). The air pump 144 is cycled off by the pump controller 156 when the target pressure is achieved in the buffer tank 142 as determined through readings of the pressure sensor 158. The mass flow control valve 154 is modulated open and air is injected into the exhaust system 24 from the buffer tank 142 through the nozzle 72 according to signals received from the controller 56 based on engine equivalence ratio and catalyst temperature. The injected air flow is controlled by the mass air flow control valve 154 based on actuator duty cycle frequency, which is directly related to the injected air flow quantities. This embodiment enables the use of a smaller air pump 156, while meeting large air flow transient requirements with accurate injection flow control.

Accordingly, engine systems reduce tailpipe gaseous (hydrocarbon and carbon monoxide) emissions and particulate matter emissions without increasing three-way catalytic converter precious metal loading, including under enrichment engine operation. The systems use three-way catalytic converter(s) with downstream air injection leading to a bow shape mixing plate to increase hydrocarbon, carbon monoxide and particulate matter consumption prior to atmospheric emission. In embodiments, a high porosity substrate with/without a two-way catalyst coating may be added downstream of the mixing plate exhaust configuration. The injected air is pressurized to overcome the exhaust gas pressure in the exhaust system by an auxiliary pump, or by an existing vehicle compressor/turbocharger to control the air injection flow. Small amounts of copper (i) oxides or precious metal coatings may be used in substrates or on the mixing plate while reducing the precious metal loadings in the three-way catalytic converters for cost saving.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An engine system comprising:
   an engine configured to consume fuel and air to generate an exhaust gas stream;
   an exhaust system configured to channel the exhaust gas stream from the engine to a tailpipe for emissions;
   a catalytic converter in the exhaust system, configured to convert constituents of the exhaust gas stream;
   a nozzle configured to inject air into the exhaust system downstream from the catalytic converter;
   a mixing plate disposed in the exhaust system downstream from the nozzle;
   sensors disposed in the exhaust system; and
   a controller configured to:
      receive inputs from the sensors;
      compute an air injection rate based on a load on the engine and the inputs; and
      command, based on the computed air injection rate, a supply of the air through the nozzle sufficient to convert the constituents remaining after the catalytic converter.

2. The engine system of claim 1, comprising an oxidation chamber disposed downstream from the catalytic converter, wherein the mixing plate and the nozzle are disposed in the oxidation chamber, the nozzle positioned so that the air is injected through the orifice at the mixing plate to impinge on the mixing plate.

3. The engine system of claim 1, wherein the mixing plate has a number of holes formed through, and distributed across, the mixing plate, and wherein the mixing plate has an outer perimeter and a series of cutouts around the outer perimeter.

4. The engine system of claim 1, comprising a substrate chamber disposed downstream from the mixing plate, wherein the substrate chamber contains a substrate configured to channel and mix the exhaust gas stream.

5. The engine system of claim 4, wherein at least one of the mixing plate and the substrate are coated with a catalyst to enhance carbon monoxide reduction in the exhaust gas stream.

6. The engine system of claim 1, wherein one of the sensors is disposed between the nozzle and the mixing plate, wherein the controller is configured to correlate the air injection rate to the load on the engine using the inputs from the one of the sensors.

7. The engine system of claim 1, wherein the catalytic converter comprises a pair of three-way catalytic converters configured to convert hydrocarbons, carbon monoxide and nitrous oxides, and comprising an oxidation chamber disposed downstream from the pair of three-way catalytic converters, wherein the mixing plate is disposed in the oxidation chamber and the exhaust system is configured to discharge the exhaust gas stream directly to atmosphere from the oxidation chamber through the tailpipe.

8. The engine system of claim 1, comprising an injection system that includes the nozzle and comprising a pump configured to pressurize air from the engine and supply the air to the nozzle.

9. The engine system of claim 8, wherein the pump comprises a turbocharger of the engine.

10. The engine system of claim 9, comprising a wastegate of the turbocharger, wherein the wastegate comprises a three-way valve configured to divert boost air to the nozzle.

11. An engine system comprising:
an engine configured to consume fuel and air to generate an exhaust gas stream;
an exhaust system configured to channel the exhaust gas stream from the engine to a tailpipe for emissions;
a first three-way catalytic converter in the exhaust system;
a second three-way catalytic converter in the exhaust system, the first and second three-way catalytic converters configured to convert constituents of the exhaust gas stream;
an air injection system with a nozzle configured to inject air into the exhaust system downstream from the first and second three-way catalytic converters; and
a mixing plate disposed in the exhaust system downstream from the nozzle, the mixing plate bow shaped with a concave shaped side facing the nozzle,
sensors disposed in the exhaust system; and
a controller configured to:
  receive inputs from the sensors;
  compute an air injection rate based on a load on the engine and the inputs; and
  command, based on the computed air injection rate, a supply of the air through the nozzle sufficient to convert the constituents remaining after the second three-way catalytic converter.

12. The engine system of claim 11, comprising an oxidation chamber disposed downstream from the first and second three-way catalytic converters, wherein the mixing plate and the nozzle are disposed in the oxidation chamber, the nozzle positioned so that the air is injected through the orifice at the mixing plate to impinge on the mixing plate, wherein the oxidation chamber includes an insulated wall to retain heat.

13. The engine system of claim 11, wherein the mixing plate has a number of holes formed through, and distributed across, the mixing plate, and wherein the mixing plate has an outer perimeter and a series of cutouts around the outer perimeter, wherein the nozzle is formed by a pipe segment extending into the exhaust system, wherein the pipe segment has a nozzle orifice comprising an opening in the pipe segment that opens in a downstream direction toward the mixing plate, wherein the nozzle has an air injector spray angle that simulates the bow shape of the mixing plate to enhance mixing.

14. The engine system of claim 11, comprising a substrate chamber disposed downstream from the mixing plate, wherein the substrate chamber contains a substrate configured to channel and mix the exhaust gas stream, wherein the substrate is coated with a two-way catalyst configured to convert hydrocarbons and carbon monoxide.

15. The engine system of claim 11, comprising a pump and a buffer tank receiving and storing air from the pump, wherein the air is injected into the exhaust system from the buffer tank and through the nozzle according to signals received from the controller.

16. The engine system of claim 11, wherein one of the sensors is disposed between the nozzle and the mixing plate, wherein the controller is configured to correlate the air injection rate to the load on the engine using the inputs from the one of the sensors.

17. The engine system of claim 11, wherein the engine includes a crankcase connected with the air injection system, wherein crankcase energy from the crankcase is configured to introduce air to the nozzle.

18. The engine system of claim 11, comprising:
an injection system that includes the nozzle;
a pump in the injection system and configured to pressurize air from the engine and supply the air to the nozzle; and
a heater in the injection system and configured to heat the pressurized air.

19. The engine system of claim 18, wherein the pump comprises a turbocharger of the engine; and comprising a wastegate of the turbocharger, wherein the wastegate comprises a three-way valve configured to divert boost air to the nozzle.

20. An engine system comprising:
an engine configured to consume a gasoline fuel and air to generate an exhaust gas stream;
an exhaust system configured to channel the exhaust gas stream from the engine to a tailpipe for emission;
a first three-way catalytic converter in the exhaust system;
a second three-way catalytic converter in the exhaust system, the first and second three-way catalytic converters configured to convert constituents of the exhaust gas stream;
an oxidation chamber disposed in the exhaust system downstream from the second three-way catalytic converter;
an air injection system with a nozzle configured to inject air into the exhaust system for mixing with the exhaust gas stream in the oxidation chamber;
a mixing plate disposed in the oxidation chamber downstream from the nozzle, the mixing plate bow shaped with a concave shaped side facing the nozzle,
sensors disposed in the exhaust system; and
a controller configured to:
  receive inputs from the sensors;
  compute an air injection rate based on a load on the engine and the inputs; and
  command, based on the computed air injection rate, a supply of the air through the nozzle sufficient to convert the constituents remaining after the second three-way catalytic converter,
wherein the engine is configured to operate at rich operational conditions producing excess carbon monoxide that saturates the first and second three-way catalytic converters,
wherein the oxidation chamber is configured to convert the excess carbon monoxide to carbon dioxide.

* * * * *